G. D. PARKER.
FRUIT BOX PRESS.
APPLICATION FILED SEPT. 14, 1910.
985,540.
Patented Feb. 28, 1911.
2 SHEETS—SHEET 2.
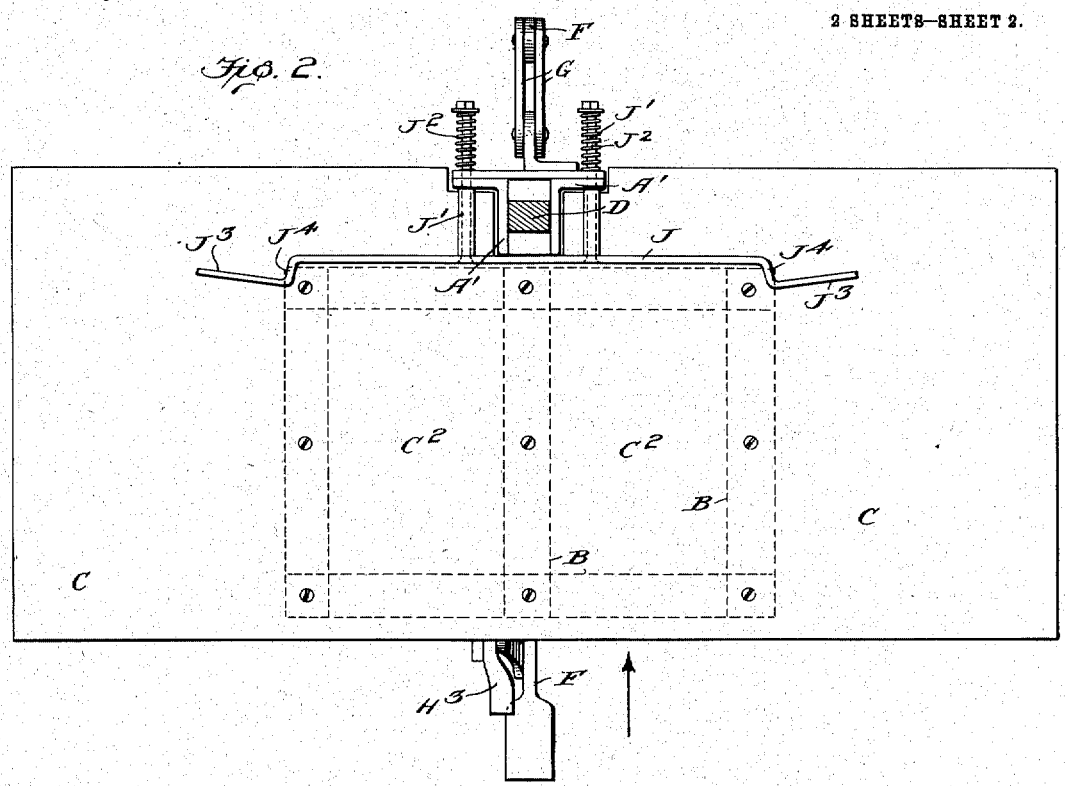
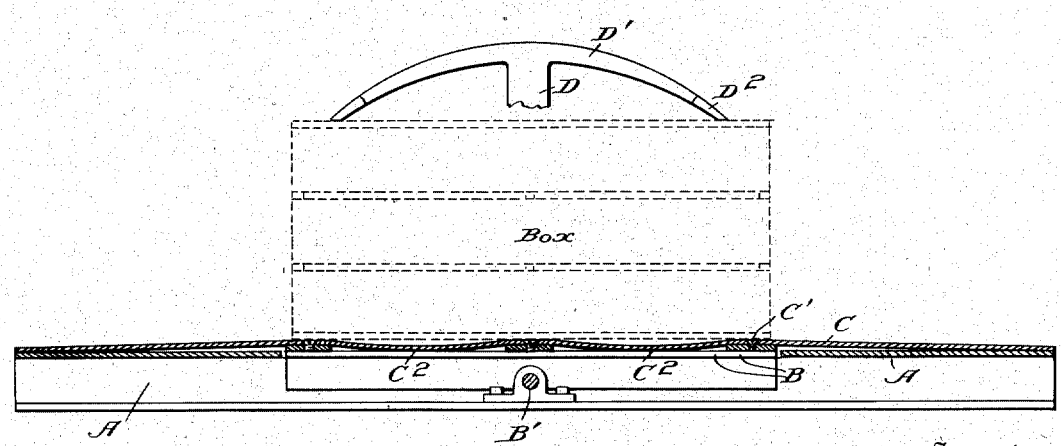
Witnesses
Edwin L. Bradford
R. Craig Greene
Inventor
George D. Parker
By Wallace Greene,
Attorney

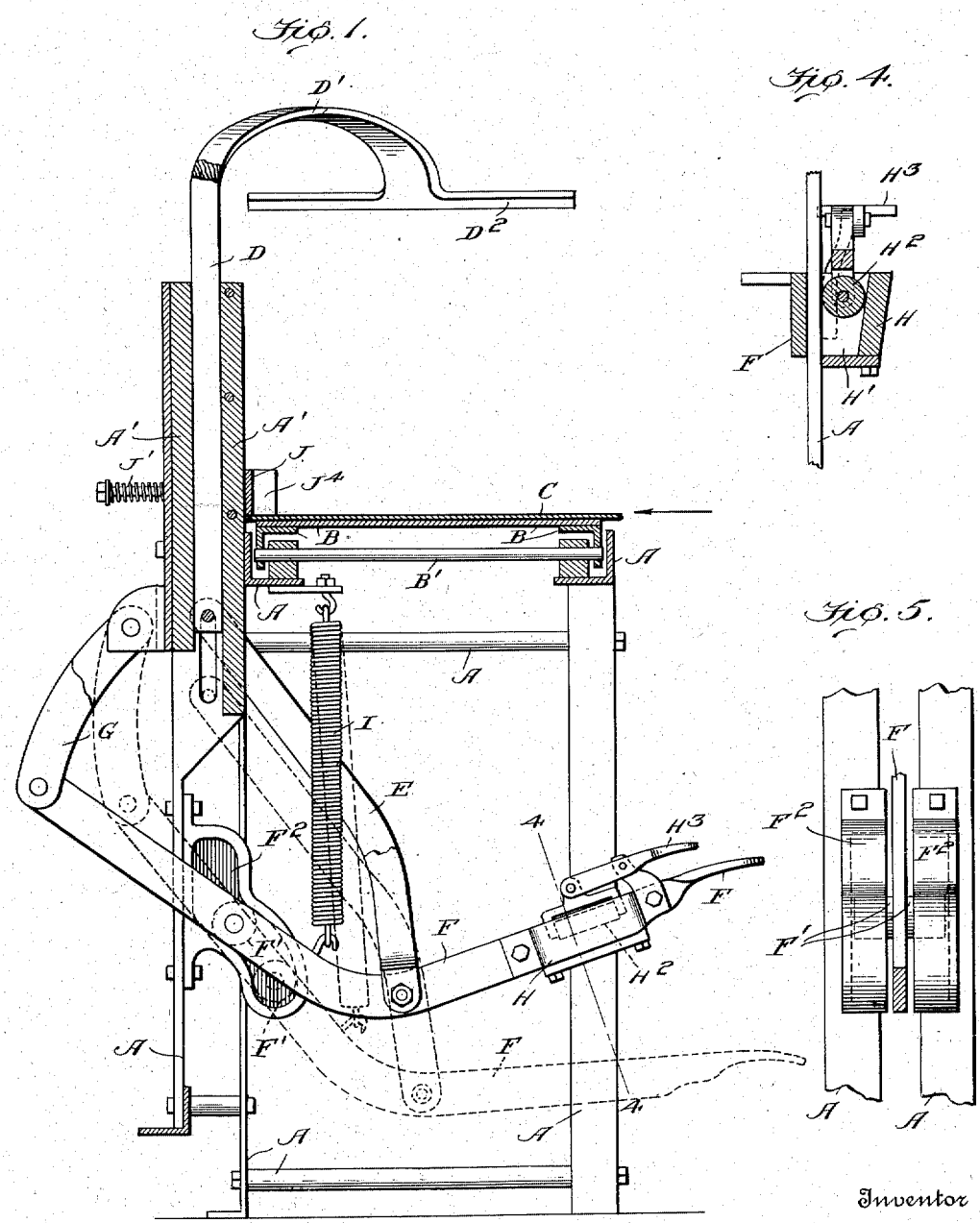

UNITED STATES PATENT OFFICE.

GEORGE D. PARKER, OF RIVERSIDE, CALIFORNIA.

FRUIT-BOX PRESS.

985,540.   Specification of Letters Patent.   Patented Feb. 28, 1911.

Application filed September 14, 1910. Serial No. 581,961.

*To all whom it may concern:*

Be it known that I, GEORGE D. PARKER, a citizen of the United States, residing at Riverside, in the county of Riverside and State of California, have invented certain new and useful Improvements in Fruit-Box Presses, of which the following is a specification, reference being had therein to the accompanying drawing.

In packing oranges or other fruit in boxes for shipment it is essential that the box be so well filled that movement of the contents within the box will not usually occur, and at the same time the pressure applied should not injure the fruit. Properly, the fruit should primarily project from the box and be slowly pressed down by the cover so that it may have time to yield and adjust itself in all parts of the box. The pressure thus applied may be quite large without danger of injury to the fruit, while if it be very suddenly applied the upper layer of fruit will be injured because there is not time for that below to adjust itself and gradually yield by slight distortion and otherwise. The best results require that the whole cover should be pressed down at once for if one piece be applied at a time, the fruit will be projected from the uncovered part and no moderate pressure can then press it back and distribute the force evenly through the mass under that part of the cover already secured. It is sometimes difficult to press the cover down and hold it securely until it is nailed, and it is always desirable to hold the cover only along or near the vertical outer and partition walls of the box, so that the intermediate portions of the thin top and bottom boards may spring outward, at least temporarily, increasing the capacity of the box and through the elastic force of the sprung boards urging the fruit to yield and adjust itself slowly after the boards are nailed, and of course compensating any yielding and leaving the contents secure against shifting even after the greatest yielding which is likely to occur.

To provide a press having all the advantages and avoiding all the evils suggested is the general object of this invention.

In my apparatus provision is made for pressing the cover down with gradually increasing power, preventing any return movement until the device is released intentionally, allowing the box to rock for equalizing pressure on its two ends, and for securing various minor desirable ends, as will appear.

In the accompanying drawings, Figure 1 is a central, transverse vertical section of the devices. Fig. 2 is a plan view of the same devices, a pressing member being broken away. Fig. 3 is a partial sectional elevation looking in the direction of the arrows of Fig. 1 and Fig. 2. Fig. 4 is a detail sectional view of a lever locking device. Fig. 5 is a detail view of a lever and its shifting pivot devices, seen also in Fig. 1.

In these views, A represents the main frame or table supporting the working parts, and B a rectangular box-supporting frame of approximately the same dimensions as the bottoms of the boxes to be used, mounted in the top of the table to rock upon a central axis perpendicular to the front of the machine, the pivoting as shown in this instance being upon a rod B', Figs. 1 and 3. The pivoted frame projects a little above the plane of the top of the table, and over both extends a thin sheet C of metal which is secured to the pivoted frame by screws C' and depressed within the members of that frame, as seen at $C^2$, Fig. 3 so that when a box is placed in proper position thereon it will be supported only along the lines of its vertical walls. Because the pivoted frame projects above the plane of the table, the metal sheet does not prevent the slight rocking of the frame. A bar D slides in a vertical way formed in a member A' of the table and is provided at its upper end with forwardly extending, laterally divergent arms D' bearing at their free ends parallel bars $D^2$ above and parallel to the end members of the pivoted frame and normally at a little more than the height of a box above the same. To the lower end of the bar D are pivotally attached bent links E, the opposite ends of which are pivoted to the central part of a foot lever F. The forward end of the latter lever lies at the front of the table in position to receive pressure from the foot of an operator, while its rear portion is upwardly inclined and provided with fulcrum rollers F' at some distance from its end and a little in the rear of the lower end of the lever E. These rollers may rise and fall and are guided in cam-like ways in members $F^2$ fixed to the main frame.

The rear end of the lever is pivoted to the lower ends of links G themselves pivoted above to a projection on the main frame, these links and the upwardly inclined portion of the lever forming the members of a toggle. In front of the pivotal or fulcrum rollers, the lever is normally held up or yieldingly supported by a spring I. When the front end of the lever is depressed the rollers are prevented from moving rearward by the walls of the ways in which they lie and the links E are drawn downward, the spring yielding, and their lower end is swung rearward as indicated in dotted lines in Fig. 1, and at the same time the rear end of the lever and links G are swung forward, straightening the toggle and forcing the rollers downward in the ways and drawing the bar D downward with very great force. Thus the force applied by the foot is at first applied directly to drawing down the pressing member but as the latter nears its lowest point is applied almost wholly to straightening the toggle, or in other words, at the last the pressure applied is greatly increased. Practically, if a box be placed upon the table under the bars $D^2$ its cover is pressed down by slow and gentle pressure applied by the foot and as it approaches the walls of the box the movement becomes still slower but the power is very greatly increased, so that no great effort is required to bring the cover into contact with the box walls, ready for nailing.

The front portion of the lever lies alongside a vertical member of leg of the main frame and to it is fixed a loop H passing around that member and forming therewith upon the side opposite the main portion of the lever a downwardly converging recess H' in which fits a roller $H^2$, pivotally suspended from the rear arm of a short lever $H^3$, the front end of which lies in position to be readily depressed by the foot which forces down the lever F. This roller offers no resistance to the descent of the latter lever but prevents any return movement so long as gravity is permitted to hold it down in the wedgelike recess, but whenever pressure is applied upon the outer end of the short lever, it is lifted and the lever F is freed from its locking and may be returned to normal position by the spring I whenever the foot permits.

To aid in adjusting the boxes accurately below the pressing device, a guide-bar J approximately parallel in general direction to the front of the table, is placed in front of the frame member A' and secured to rods J' extending rearwardly through said member and yieldingly held by springs $J^2$. The bar has rearwardly inclined ends $J^3$ and oppositely and rearwardly inclined offsets $J^4$, so that a box pushed suddenly rearward either directly or obliquely is urged into exact position.

It is to be noted that if the cover be a little higher at one end than at the other, the box automatically rocks the supporting frame and thus at the outset the pressure is distributed.

The thin metal sheet C might be omitted without rendering the apparatus inoperative, but its presence is highly desirable since it allows boxes to be pushed in any direction over the table with no possibility of catching and thus facilitates rapid work.

It is obvious that the thin bottom and top boards are held only along the nailing lines and that the springing of the intermediate parts temporarily increases the capacity of the box, and that the elastic force of the boards compensates for any permanent yielding or adjustment of the fruit after the box is nailed, and thus insures its being held properly at all times.

What I claim is:

1. In a box press, the combination with a box support and a vertically guided, cover pressing member, of a toggle connected to said member to force it downward, as the toggle straightens and means whereby force applied by the operator tends to straighten said toggle.

2. In a box press, the combination with a box support and a cover pressing member arranged to move toward the same, of a foot lever having a guided movable fulcrum between its ends, a link pivotally connecting said member to said lever at one side of its fulcrum, a link pivotally connecting the opposite end of the lever to a fixed support and forming with it a toggle adapted to force the fulcrum downward as the lever swings.

3. In a box press, a cover pressing member, a foot lever having a guided movable fulcrum below said member, links pivoted to said lever upon opposite sides of its fulcrum and connected respectively to a fixed support and said member.

4. In a box press, a vertically movable box pressing member, a lever having below said member a guided downwardly movable fulcrum, links pivoted to said lever on opposite sides of the fulcrum, respectively, and a spring yieldingly resisting downward movement of the link connected to said member.

5. The combination with the supporting table and an open box supporting frame pivoted therein, of a metal sheet extending over the table and frame and depressed between the pivoted frame members, and a cover pressing device adapted to press the cover along lines parallel to and near its ends.

6. The combination with a table, a box supporting frame pivoted therein and a metal sheet covering the table and frame, of a vertical pressing member sliding in ways in the frame and adapted to press the box cover near its ends, a bent foot lever having between its ends a downwardly movable fulcrum in cam-like ways, a spring resisting the depression of the lever by the foot, links pivotally connecting the rear end of the lever to a fixed support, links connecting said member to said lever at a point on the opposite side of the fulcrum, and automatic means for preventing return movement of the depressed lever.

7. In a box press, the combination with a box supporting table, and a cover pressing device sliding vertically in a way therein, of a lever having an inclined portion, provided with a movable fulcrum, an oppositely inclined link connecting the end of said inclined portion with the table and forming with that portion a toggle for depressing the fulcrum, and a link connecting said device with the lever at a point which swings approximately into line with the upper end of the link and the fulcrum when the toggle straightens.

In testimony whereof I affix my signature in presence of two witnesses.

GEORGE D. PARKER.

Witnesses:
D. W. LEWIS,
RENA E. SMITH.